US008861590B2

(12) United States Patent
Krishnamachari (10) Patent No.: US 8,861,590 B2
(45) Date of Patent: Oct. 14, 2014

(54) METHODS AND SYSTEMS FOR SIGNAL INSERTION

(75) Inventor: Santhana Krishnamachari, Mableton, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1977 days.

(21) Appl. No.: 11/460,543

(22) Filed: Jul. 27, 2006

(65) Prior Publication Data

US 2007/0064739 A1 Mar. 22, 2007

Related U.S. Application Data

(60) Provisional application No. 60/703,912, filed on Jul. 29, 2005.

(51) Int. Cl.
| | | |
|---|---|---|
| H04N 7/12 | (2006.01) | |
| H04N 11/02 | (2006.01) | |
| H04N 11/04 | (2006.01) | |
| H04J 3/06 | (2006.01) | |
| H04N 21/235 | (2011.01) | |
| H04N 21/435 | (2011.01) | |
| H04N 21/434 | (2011.01) | |
| H04N 21/845 | (2011.01) | |
| H04N 21/44 | (2011.01) | |
| H04N 21/2383 | (2011.01) | |
| H04N 21/2365 | (2011.01) | |
| H04N 21/234 | (2011.01) | |
| H04N 21/238 | (2011.01) | |
| H04H 20/10 | (2008.01) | |

(52) U.S. Cl.
CPC ............. *H04H 20/10* (2013.01); *H04N 21/235* (2013.01); *H04N 21/435* (2013.01); *H04N 21/4347* (2013.01); *H04N 21/8455* (2013.01); *H04N 21/44016* (2013.01); *H04N 21/2383* (2013.01); *H04N 21/23655* (2013.01); *H04N 21/23424* (2013.01); *H04N 21/23805* (2013.01); *H04N 21/2365* (2013.01)
USPC .................. 375/240.01; 375/240.28; 370/504

(58) Field of Classification Search
USPC ....................................... 375/240.1
See application file for complete search history.

(56) References Cited

U.S. PATENT DOCUMENTS

| | | | |
|---|---|---|---|
| 5,600,366 A | 2/1997 | Schulman | |
| 6,330,286 B1 * | 12/2001 | Lyons et al. ............. | 375/240.28 |
| 6,487,721 B1 | 11/2002 | Safadi | |
| 6,611,624 B1 | 8/2003 | Zhang et al. | |
| 6,704,930 B1 | 3/2004 | Eldering et al. | |
| 6,724,996 B1 | 4/2004 | Ballintine et al. | |
| 6,806,909 B1 | 10/2004 | Radha et al. | |

(Continued)

OTHER PUBLICATIONS

Brassil, et al., "Program Insertion in Real-Time IP Multicasts," ACM SIGCOMM, vol. 29, No. 2, pp. 49-68 (1999).

(Continued)

*Primary Examiner* — Hee-Yong Kim
(74) *Attorney, Agent, or Firm* — Troy A. Van Aacken (57) ABSTRACT

Methods and systems that support downstream media signal insertion into a digital signal without affecting digital signal quality is presented here. The methods and systems can utilize pre-defined bitrate values assigned to media signals and allocate that bitrate to a portion of a digital signal that will be replaced by the media signal. The methods are equally applicable to both open and closed-loop encoding systems.

33 Claims, 3 Drawing Sheets

(56) References Cited

U.S. PATENT DOCUMENTS

| | | | |
|---|---|---|---|
| 6,993,081 | B1 | 1/2006 | Brunheroto et al. |
| 7,031,348 | B1 * | 4/2006 | Gazit .......................... 370/504 |
| 7,068,719 | B2 | 6/2006 | Liu et al. |
| 7,068,724 | B1 | 6/2006 | Hamilton |
| 2002/0067718 | A1 | 6/2002 | Coupe et al. |
| 2002/0196850 | A1 | 12/2002 | Liu et al. |
| 2005/0015816 | A1 | 1/2005 | Christofalo et al. |
| 2005/0022253 | A1 | 1/2005 | Chen et al. |
| 2005/0276284 | A1 | 12/2005 | Krause et al. |
| 2006/0075449 | A1 | 4/2006 | Jagadeesan et al. |

OTHER PUBLICATIONS

Brassil and Kim, "Large-Scale Personalized Video Streaming with Program Insertion Proxies," *IEEE Comm Mag*, 104-110 (2004).

"Cisco 6920 RateMUX Advanced MPEG-2 Multiplexer, Future-proofing the cable headend with advanced digital video capabilities," *Cisco Systems, Inc.*, pp. 1-5, 1992-2005.

"Digital Program Insertion—Project Primer", www.cablelabs.com/proiects/dpi/primer/, Apr. 21, 2005.

EGT, Inc. Press Release, Guaranteed Bandwidth for Cable Advertisers With Ratelock From EGT, www.egtinc.com/pr/pr23.html, Atlanta, Apr. 6, 2006.

Kar, "MPEG-4 in Broadband Streaming Applications, Part II," *SPECS News & Technology from CableLabs®*, vol. 13, No. 3, May/Jun. 2001.

Kelso, "Understanding and Deploying Transport Streams Insertion," *SeaChange International, Inc.*, pp. 1-22 (Jun. 2000).

Liang and Girod, "Prescient R-D Optimized Packet Dependency Management for Low-Latency Video Streaming," Proceedings 2003 International Conference on Image Processing (Cat. No. 03CH37429), *IEEE*, Part vol. 3, pp. II-659-II-662 (2003).

"Terayon: Ad Insertion for Cable," Terayon Communication Systems, Nov. 2003.

Thomas, "Serving Up Data for Enhanced DTV Programs," *SMPTE J*, vol. 110, No. 5, pp. 299-303 (2001).

* cited by examiner

METHODS AND SYSTEMS FOR SIGNAL INSERTION

CROSS REFERENCE TO RELATED PATENT APPLICATIONS

This application claims priority to U.S. Provisional Application No. 60/703,912 filed Jul. 29, 2005, herein incorporated by reference in its entirety.

BACKGROUND

The advent of MPEG-2 digital video technology has brought the potential for vast improvements in the quality and quantity of programming. At the same time, this technology has significantly increased the complexity of managing video. An example of these complexities is the downstream insertion of a media signal having a first bitrate into a digital signal having a second bitrate. The first bitrate is not the same as the second bitrate, leading to either an over-utilization or an under utilization of bitrate. In a video advertisement (ad) context, local ad insertion systems enable cable multiplexers and broadcast affiliates to insert locally-generated commercials and short programs into remotely distributed regional programs before they are delivered to home viewers. This ad insertion can be accomplished by an architecture where ads are inserted by a downstream splicer on pre-encoded video streams. In this architecture, the original MPEG-2 or H.264 bitstream that is present in one or more of the channels in the multiplex is replaced by a bitstream of an ad that is read from an ad-server. Downstream ad-insertion affects the performance of closed-loop or open-loop encoding systems by modifying the multiplex that has been created by optimally distributing the available bits among different channels in which the inserted ad is not included. This results in reduced video quality or lesser number of channels in a given channel bandwidth since the downstream ad-insertion information is not incorporated while the multiplex is created. The bitrates of the inserted ads may not be exactly same as the bitrates of the MPEG-2 streams that are being replaced. Because of this, the aggregate bitrate of the multiplex after downstream ad-insertion can exceed the channel bandwidth which necessitates rate-reduction of one or more of the channels that results in degradation of the video quality. To avoid the need for the downstream rate-shaping in closed-loop, or open-loop, encoding, systems can generate a multiplex with an aggregate video bitrate that is lower than the transmission channel bandwidth in anticipation of ad-insertion downstream. This conservative approach supports ad-insertion but reduces multiplex capacity when there is no ad-insertion. Since ads are inserted typically for an average of 5-10 minutes over an hour, this approach results in underutilization of bandwidth for the rest of the time.

There is a need in the art for a system that supports downstream media signal insertion into a digital signal without affecting the quality of the digital signal.

SUMMARY

Methods and systems that supports downstream media signal insertion into a digital signal without affecting the quality of the digital signal is presented here. The methods and systems can utilize pre-defined bitrate values assigned to media signals (for example, ads) and allocate that bitrate to a portion of a digital signal (for example, an MPEG stream) that will be replaced by the media signal. Advantages of the methods and systems will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments of the methods and systems and together with the description, serve to explain the principles of the methods and systems.

DETAILED DESCRIPTION

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments of the methods and systems and the Examples included therein and to the Figures and their previous and following description. The present methods and systems can be implemented in software a part of which resides in the encoder(s) and a part that resides in a multiplexer in an open loop system or in a rate controller in a closed-loop system.

The methods and systems described pertain to media signal insertion into a digital signal. Media signals and digital signals can include video, audio, and combinations thereof. Examples include, but are not limited to MPEG streams, advertisements, movies, songs, video programs, audio clips, and the like. For purposes of illustration, the methods and systems are described herein in the context of advertisement insertion.

I. Methods Generally

Provided herein is a method for bit allocation for media signal insertion comprising receiving, by a plurality of encoders, a plurality of media inputs, converting the plurality of media inputs into a plurality of digital signals, inserting, by the plurality of encoders, a first message into at least one of the plurality of digital signals indicating a media signal splice-in point and a media signal splice-out point, sending, by the plurality of encoders, a second message to a rate controller indicating the media signal splice-in point and the media signal splice-out point for each digital signal, synchronizing the plurality of encoders to a common time base, aligning the media signal splice-in points and the media signal splice-out points of the digital signals, and allocating a bitrate, to each of the digital signals having media signal splice-in and splice out points, between the media signal splice-in points and the media signal splice-out points according to media signal encoding.

The media input can be, for example, a video input, an audio input, and the like. The media signal can be, for example, an advertisement, a movie, a song, a video program, an audio clip, and the like.

If the media signal is encoded at a constant bitrate, the method can further comprise receiving a pre-defined bitrate for a media signal. The allocated bitrate can be the pre-defined bitrate, irrespective of coding complexity of a program in which the media signal is inserted.

If the media signal is encoded at a variable bitrate, the allocated bitrate can be a maximum of the variable bitrate, irrespective of coding complexity of a program in which the media signal is inserted.

Further provided herein is a method for bit allocation for media signal insertion comprising receiving, by a plurality of encoders, a plurality of media inputs, encoding the plurality of media inputs into a plurality of digital signals, inserting, by the plurality of encoders, a first message into at least one of the plurality of digital signals indicating a media signal splice-in point and a media signal splice-out point, and allocating a bitrate to each of the digital signals having a first message according to media signal encoding.

The media input can be, for example, a video input, an audio input, and the like. The media signal can be, for example, an advertisement, a movie, a song, a video program, an audio clip, and the like.

The method can further comprise sending, by the plurality of encoders, a second message to a rate controller indicating the media signal splice-in point and the media signal splice-out point for each digital signal and synchronizing, by the rate controller, the plurality of encoders to a common time base, aligning the media signal splice-in points and the media signal splice-out points of the digital signals having a second message.

If the media signal is encoded at a constant bitrate, the method can further comprise receiving a pre-defined bitrate for a media signal. The allocated bitrate can be the pre-defined bitrate, irrespective of coding complexity of a program in which the media signal is inserted.

If the media signal is encoded at a variable bitrate, the allocated bitrate can be a maximum of the variable bitrate, irrespective of coding complexity of a program in which the media signal is inserted.

II. Ad Insertion Overview

There are a variety of methods for media signal (including advertisement) insertion. Until recently, most ad-insertion systems were entirely analog. Programs were distributed as NTSC video with analog cue-tones to cable multiplexers. Cue-tones signaled the local operator to replace national ads with local ads. Ad-insertion equipment, for example splicers and storage devices, can be used for local insertion. Storage devices, for example tape decks, can be used to store the ads.

With the advent of digitally-compressed video, most ad-insertion systems have been replaced by hybrid systems. In hybrid systems, ads are stored in MPEG-2 compressed format in local storage, for example on an ad server; the network feed to the multiplexer, or headend, can comprise a plurality of streams, and can be analog or the feed can be previously digitally encoded. The channel emanating from the multiplexer to a cable/satellite distributor or to subscribers homes can also be analog or digital.

If the network feed is analog embedded with analog cue-tones, the digital ad is retrieved from the local server, decompressed and converted to analog. When the analog ad is ready to be used, the analog splicer switches from the network feed to the local ad. At the end of the ad, the splicer switches back to the network feed. The analog output of the splicer can be encoded to digital if the channel is digital.

If the network feed is digital with embedded cue signals, the digital cue-signals are converted to ON-OFF signals and the digital feed is converted back to analog. If the channel is digital, the analog output of the splicer is digitally encoded. If the network feed and channel are both digital, the feed and the ad are converted back into analog prior to ad insertion. The ad-inserted analog content is then encoded back to digital before delivery to the cable/satellite distributor or subscriber. The conversion from digital to analog and then back to digital is an expensive process and video quality deteriorates from the conversions.

To overcome limitations associated with analog cue-tone and analog/hybrid ad-insertion systems, particularly in compressed video delivery environments, the cable industry began the Digital Program Insertion (DPI) initiative with the goal to create a set of DPI standards to assist in replacing existing analog/hybrid ad-insertion systems—the equipment built upon these standards also will be interoperable.

The first standard, SCTE 35 2001 (formerly DVS253), Digital Program Insertion Cueing Message for Cable, supports splicing of MPEG-2 streams for digital program insertion including ad insertion. A companion standard, SCTE 30 2001 (formerly DVS380), Digital Program Insertion Splicing API, creates a standardized method for communication between servers and splicers for the insertion of content into any MPEG-2 output multiplex in the splicer. In 2003, SCTE 35 was greatly enhanced to exploit advanced DPI capabilities. The enhanced SCTE 35 standard enables implementation of targeted advertisement and other time-triggered applications, such as network/local storage. The DPI group has been working on creating new drafts to standardize subsystems in the DPI end-to-end architecture. These include the automation system to compression system API, ad-server file format, traffic system to ad-insertion system API, and client-based advertising API Splice Points in an MPEG-2 transport stream provide opportunities to switch from one program to another. They indicate a place to switch or a place in the bit stream where a switch can be made. Splice-in points are points in the MPEG bitstream where the ad stream can begin to replace the original program stream. Splice-out points are points in the bitstream where the ad-insertion ends. Splice-break is defined as the interval between the splice-in and splice-out point over which the downstream ad-insertion is performed.

III. Media Signal Insertion in a Closed-Loop System

Figure 1:
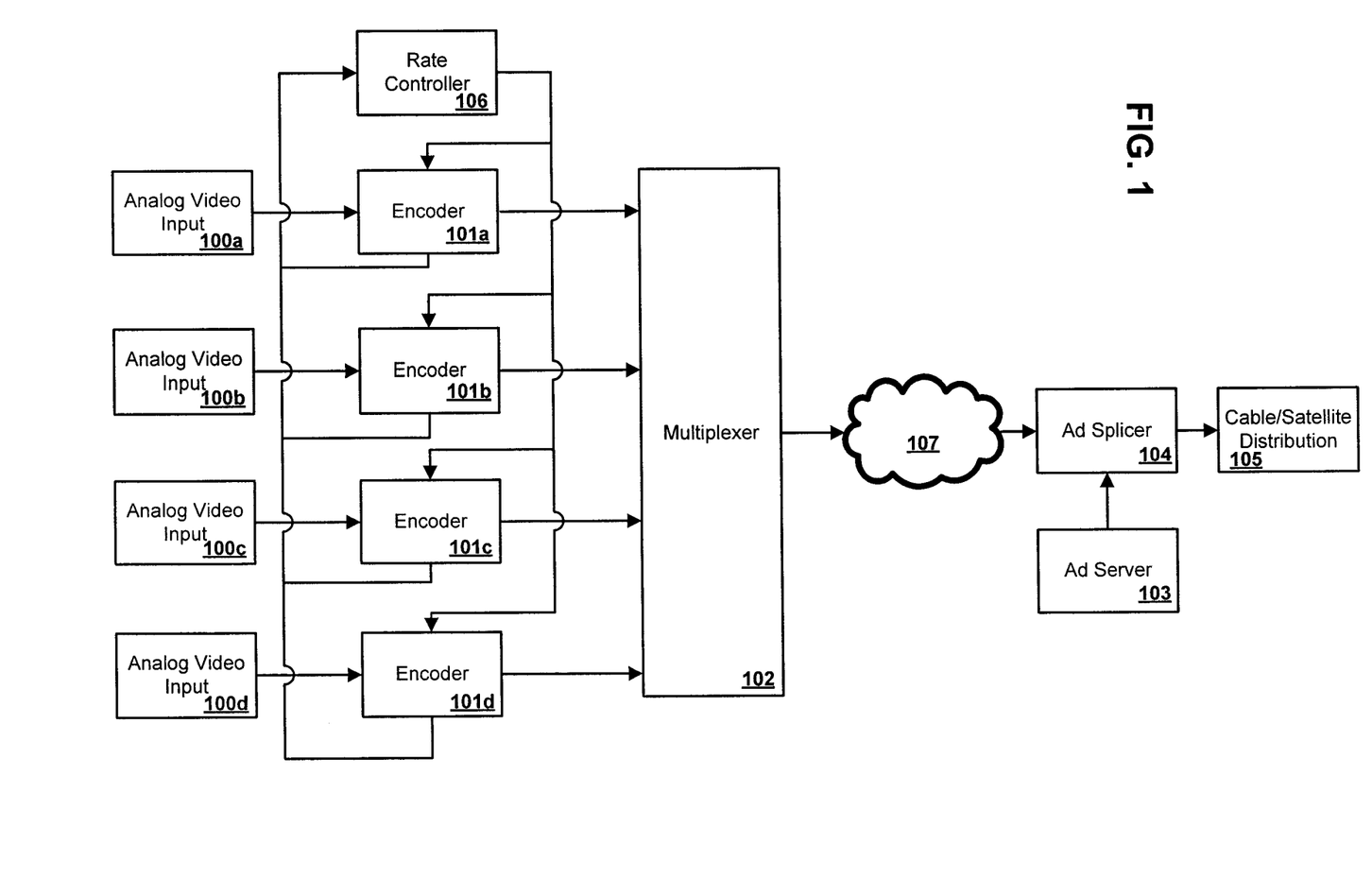
FIG. 1 is system diagram illustrating a closed system capable of performing the disclosed method.

FIG. 1 illustrates an exemplary closed-loop system in which the disclosed methods can be practiced. A closed-loop MPEG2 encoding system comprises a bank of digital encoders (101$a,b,c$ . . . ) and a closed-loop rate controller (indicated as block 106). Closed-loop encoding systems offer improved compression efficiency or more channels in a given bandwidth by dynamically adapting the coding bitrates of the encoders (101a,b,c . . . ) that are under the supervision of the rate controller (106). The encoders (101a,b,c . . . ) in a closed-loop system can use a look-ahead processing technique to estimate the coding complexity of a digital signal, for purposes of illustration, MPEG bitstreams. The coding complexity information from different encoders (101a,b,c . . . ) can then be passed on to a rate controller (1 06). The rate controller (106) uses this complexity information to make a centralized and optimal decision about the bitrates to be used by different encoders (101a,b,c . . . ) such that the sum total of their bitrates is at or below the transmission channel bandwidth. The MPEG bitstreams from the encoders can then be fed to a multiplexer which combines the individual streams to create a multi-program transport stream (MPTS). The rate controller (106) and the multiplexer (102) are shown as different entities, but they may be a part of a single physical system.

Downstream media signal, for purposes of illustration, advertisement, insertion affects the performance of closed-loop encoding system by modifying the multiplex that has been created by optimally distributing the available bits among different channels in which the inserted ad is not included. This results in reduced video quality or lesser number of channels in a given channel bandwidth because of the following reasons:

The bitrates of the inserted ads may not be exactly same as the bitrates of the MPEG-2 streams that are being replaced. Therefore the aggregate bitrate of the multiplex can be more than the channel bandwidth which required rate-reduction of one or more of the channels that results in degradation the video quality. This rate reduction severely affects the quality of the channels that are already coded at low bitrates.

To avoid the need for the rate-shaping, the closed-loop system can generate a multiplex with an aggregate video bitrate that is lower than the transmission channel bandwidth in anticipation of ad-insertion downstream. This conservative approach supports ad-insertion but reduces the multiplex capacity when there is no ad-insertion. Since ads are inserted typically for an average of 5-10 minutes over an hour, this approach results in underutilization of bandwidth for the rest of the time.

The disclosed closed loop system supports downstream ad-insertion without affecting the video quality performance of the system. A plurality of analog media inputs, for purposes of illustration video inputs, (100a,b,c, . . . ) can be received by digital video encoders (101a,b,c . . . ) and digitally encoded into MPEG bitstreams. DPI messages can be inserted by the encoders (101a,b,c . . . ) into the MPEG bitstreams. The DPI messages can be sent in-band in the MPEG stream as defined by the SCTE-35 standard. The DPI messages can be generated as follows. DTMF cue tones can be present in an analog audio signal present in the analog video input (100a,b,c . . . ) to indicate ad-insertion points. The encoders (101a,b,c . . . ) can receive the DTMF cue tones and convert them to SCTE-35 messages. Alternatively, the cue tones can be converted to contact closures and then to DVS 525 messages by external devices (not shown) that can be connected to the encoders (101a,b,c . . . ). These DVS 525 messages can then be used by the encoders (101a,b,c . . . ) to generate and insert SCTE-35 messages that are in turn used by ad splicer 104 to insert ads.

When the encoders (101a,b,c . . . ) in the closed-loop system receive a DTMF cue tone, contract closure signal or DVS 525 message, in addition to generating an SCTE-35 message for the splicer (104), the encoders (101a,b,c . . . ) can also generate and send a proprietary mediaad-insert message to the rate controller (106) indicating the splice-in and splice-out points of the downstream ad-insertion. The rate controller (106) is illustrated in FIG. 1 as a self contained device, however, the rate controller (106) can be contained within the multiplexer (102). By receiving these ad-insert messages from all the encoders (101a,b,c . . . ) in the closed-loop system, the rate controller (106) precisely knows the splice-breaks for all different programs that will undergo ad-insertion over a given interval of time. The encoders (101a,b, c . . . ) can be synchronized with a common time base that is used by the rate controller (106) to temporally align the in and out points of the ad-insert messages from different encoders (101a,b,c . . . ).

The rate controller (106) can incorporate information received through the ad-insert messages in the following ways:

If the ad that will be inserted in a particular program is encoded at a constant bitrate (defined as DPI_avail rate) and the DPI_avail rate value is pre-defined, then the rate controller (106) can allocate that particular channel the DPI_avail bitrate of the ad irrespective of the coding complexity of the program. Since this portion of the MPEG stream will be replaced by the ad over the splice-break period, this will ensure that the total aggregate bitrate does not overshoot the channel bandwidth during downstream ad-insertion. This avoids the need for any rate-reduction. The DPI_avail bitrate value for the ads can be provided by the service provider. This also simplifies the design of the downstream ad splicer (104) as it is not required to perform any rateshaping.

If the ad that will be inserted in a particular program, is encoded at a variable bitrate and the maximum bitrate value is pre-defined, then the rate controller (106) can allocate that particular channel the maximum bitrate of the ad irrespective of the coding complexity of the program.

The MPEG bitstreams from the encoders (101a,b,c . . . ) with the SCTE-35 messages for the ad splicer (104) can be received by the multiplexer (102) and combined into a single channel. The downstream ad splicer (104) can receive the stream from the multiplexer (102) via a network (indicated as block 107). The in and out points of ads, inserted by the encoders (101a,b,c . . . ), can be identified by the downstream ad splicer (104) using the DPI SCTE-35 messages. The downstream ad splicer (104) can insert the ads retrieved from ad server (103) into the stream.

By using the above strategy, the closed-loop system ensures that whenever there is downstream ad-insertion in one or more of the program, that information has been appropriately incorporated by the rate controller (106) in allocating bit budgets to the encoders. This strategy avoids the need for any rate-reduction following the ad-insertion and also avoids the need for reserving bandwidth for anticipated ad-insertion which results in under-utilization when there is no insertion.

IV. Media Signal Insertion in an Open System

Figure 2:
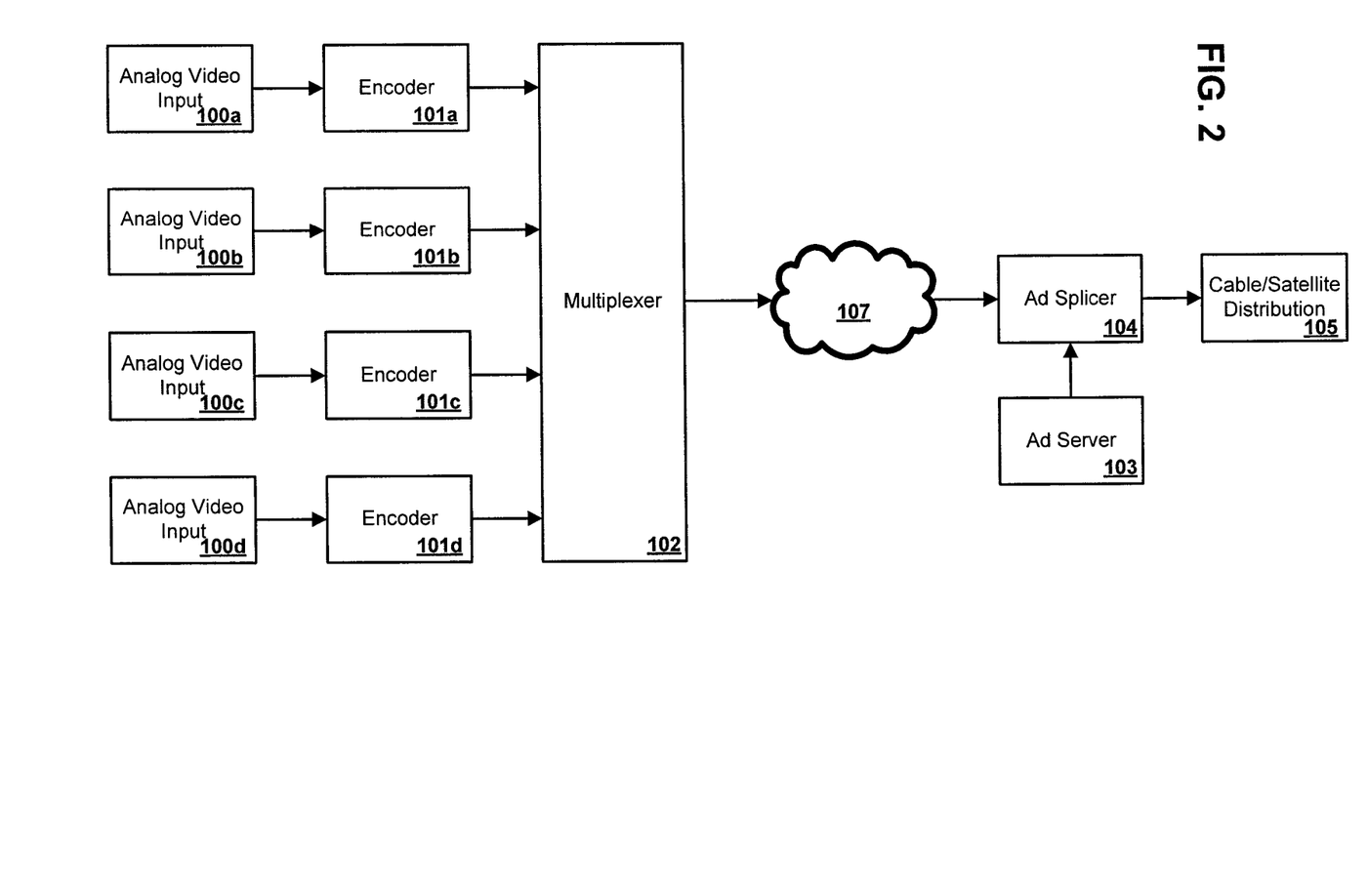
FIG. 2 is system diagram illustrating an open system capable of performing the disclosed method.

FIG. 2 illustrates an exemplary open system in which the disclosed methods can be practiced. A plurality of analog media inputs, for purposes of illustration video inputs, (indicated as blocks 100a,b,c, . . . ) can be received by digital encoders (indicated as blocks 101a,b,c . . . ) and digitally encoded into digital signals (for purposes of illustration, MPEG bitstreams). The encoders (101a,b,c) can insert the in and out time points of downstream media signals (for purposes of illustration advertisements) using messages (such as DPI or SCTE-35 messages) to be used by the ad splicer (104). By way of example, the messages can be sent in-band in the MPEG stream as defined by the SCTE-35 standard. The messages can be inserted by the encoders (101a,b,c . . . ).

DTMF cue tones can be present in an analog audio signal of the analog video input (100a,b,c . . . ) to indicate the media signal insertion points. The encoders (101a,b,c . . . ) can receive the DTMF cue tones and convert them to messages (such as DPI or SCTE-35 messages). Alternatively the cue tones can be converted to contact closures and then to DVS 525 messages by external devices (not shown) that are connected to the encoders (101a,b,c . . . ). These DVS 525 messages can then be used by the encoders (101a,b,c . . . ) to generate and insert messages (such as DPI or SCTE-35 messages) into their respective streams that are used by a downstream ad splicer (104) to insert the ads.

In an open-loop multiplexing operation, MPEG bitstreams from different encoders (101a,b,c . . . ) are fed to the multiplexer (102) which combines the individual single program transport streams (SPTS) to a single multi program transport stream (MPTS). In addition, the sum of the individual bitrates of the encoder (101a,b,c . . . ) feeding the multiplexer (102) is higher than the output bitrate of the multiplexer (102). The multiplexer (102) performs statistical rateshaping by reducing the bitrates of different channels according to the encoding complexity of the streams. As the name open-loop indicates, there is no other feedback from the multiplexer (102) to the encoders (101a,b,c . . . ) as opposed to the previously presented closed-loop multiplexing system.

The digital signals from the encoders (101a,b,c . . . ) with the messages for the ad splicer (104) can be received by the multiplexer (102) and combined into a single channel. By receiving the messages from all the encoders (101a,b,c . . . ), the multiplexer (102) precisely knows the ad splice-in and ad splice-out points for the different programs that will undergo ad-insertion over a given interval of time. The multiplexer (102) can incorporate information received through the messages in the following ways:

If the ad that will be inserted in a particular program is encoded at a constant bitrate (defined as DPI_avail rate) and the DPI_avail rate value is pre-defined, then the multiplexer (102) can allocate that particular channel the DPI_avail rate of the ad for the splice-break period irrespective of the coding complexity of the program. Since this portion of the MPEG stream will be replaced by the ad, this will ensure that the total aggregate bitrate does not overshoot the channel bandwidth. This avoids the need for any rate-reduction during downstream ad-splicing. This also simplifies the design of the downstream ad splicer (104) as it is not required to perform any rateshaping. The bitrate value for the ads can be provided by the service provider.

If the ad that will be inserted in a particular program is encoded at a variable bitrate and the maximum bitrate value is pre-defined, then the multiplexer (102) can allocate that particular channel the maximum bitrate of the ad irrespective of the coding complexity of the program.

The downstream ad splicer (104) can receive the stream from the multiplexer (102) via a network (indicated as block 107). The in and out points of ads, inserted by the encoders (101a,b,c . . . ), can be identified by the downstream ad splicer (104) using the messages (such as DPI or SCTE-35 messages). The downstream ad splicer (104) can insert the ads retrieved from an ad server (indicated as block 103) into the stream.

By using the above strategy, the open system ensures that whenever there is downstream ad-insertion in one or more of the program, that information has been appropriately incorporated by a rate controller in the multiplexer (102) in allocating bit budgets to the encoders. This strategy avoids the need for any rate-reduction following the ad-insertion and also avoids the need for reserving bandwidth for anticipated ad-insertion which results in under-utilization when there is no insertion.

V. Exemplary Method Implementation

Figure 3:
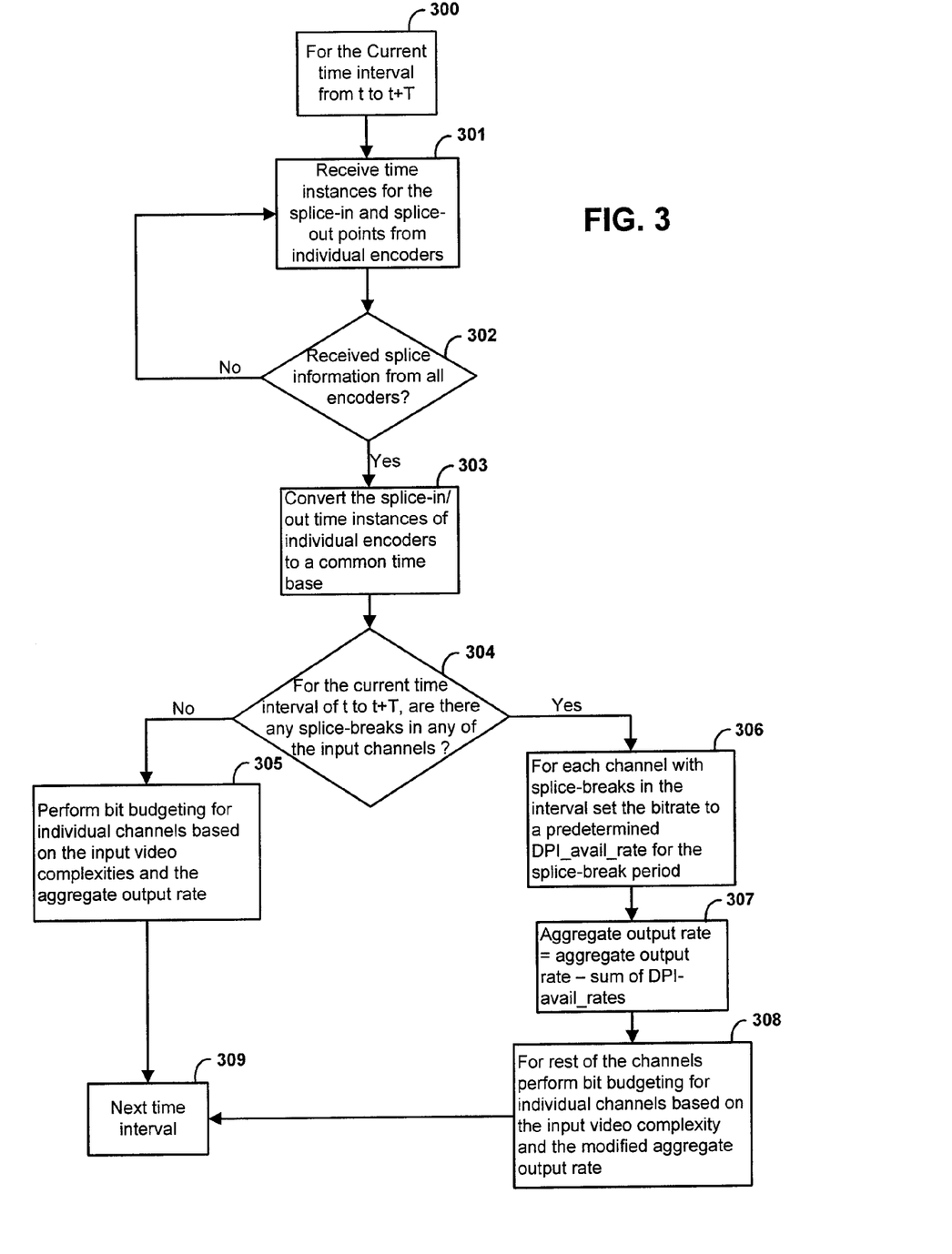
FIG. 3 is a logic flow diagram illustrating the basic steps of an exemplary implementation of the disclosed method.

FIG. 3 illustrates an exemplary implementation of the disclosed methods. For the Current time interval from t to t+T (300), the rate controller, which can be integrated into a multiplexer or can be a separate device, receives time instances for the splice-in and splice-out points from individual encoders (301) through the ad_insert messages. The method performs a check to determine if it has received splice information form all encoders (302). If splice information from all the encoders has not been received, the method returns to block 301. If, at block 302, splice information has been received from all the encoders, the method converts the splice-in/out time instances of individual encoders to a common time base (303) and then performs a check to determine if, for the current time interval of t to t+T, there are any splice-breaks in any of the input channels (304). If there are no splice-breaks in any of the input channels for the current time interval of t to t+T, the method performs bit budgeting for individual channels based on the input video complexities and the aggregate output rate (305). The method then proceeds to the next time interval (309). If, however, there are splice-breaks in one or more of the input channels for the current time interval of t to t+T, then for each such channel the method sets the bitrate to a pre-determined DPI_avail rate value for the splice-break period (306). The pre-determined DPI_avail_rate can be selected by, for example, a cable operator. An exemplary DPI_avail_rate can be the VoD default rate of 3.75 mbps. The method then proceeds to set the aggregate output rate equal to the aggregate output rate less the sum of DPI_avail rates (307). The method continues to block 308, where, for the rest of the channels, the method performs bit budgeting for individual channels based on the input video complexity and the modified aggregate output rate. The method then proceeds to the next time interval (309).

The disclosed method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

An implementation of the disclosed method may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

While this invention has been described in connection with preferred embodiments and specific examples, it is not intended that the scope of the methods and systems be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the methods and systems. Other embodiments of the methods and systems will be apparent to those skilled in the art from consideration of the specification and practice of the methods and systems disclosed herein. It is intended that the specification and examples be considered as exemplary only, with a true scope and spirit of the methods and systems being indicated by the following claims.

The invention claimed is:

1. A method for bit allocation for media signal insertion comprising:
   receiving, by a plurality of encoders, a plurality of media inputs;
   converting the plurality of media inputs into a plurality of digital signals;
   inserting, by the plurality of encoders, a first message into at least one of the plurality of digital signals indicating a media signal splice-in point and a media signal splice-out point;
   sending, by the plurality of encoders, a second message to a rate controller indicating the media signal splice-in point and the media signal splice-out point for each digital signal;
   synchronizing the plurality of encoders to a common time base, aligning the media signal splice-in points and the media signal splice-out points of the digital signals; and
   allocating a fixed bitrate to each of the digital signals having media signal splice-in and splice-out points, the fixed bitrate being allocated for the period between the media signal splice-in points and the media signal splice-out points according to media signal encoding, the fixed bitrate allocation facilitating an encoder to splice a constant bit rate video signal into each of the digital signals between the splice-in and splice-out points without using a transcoder.

2. The method of claim 1 wherein the media signal is encoded at a constant bitrate.

3. The method of claim 2 further comprising:
   receiving a pre-defined bitrate for a media signal.

4. The method of claim 3 wherein the allocated bitrate is a pre-defined bitrate, irrespective of coding complexity of a program in which the media signal is inserted.

5. The method of claim 1 wherein the media signal is encoded at a variable bitrate.

6. The method of claim 5 wherein the allocated bitrate is a maximum of the variable bitrate, irrespective of coding complexity of a program in which the media signal is inserted.

7. The method of claim 1 wherein the media input is selected from the group consisting of:
   a video input; and
   an audio input.

8. The method of claim 1 wherein the media signal is selected from the group consisting of:
   an advertisement;
   a movie;
   a song;
   a video program; and
   audio clip.

9. A method for bit allocation for media signal insertion comprising:
   receiving, by a plurality of encoders, a plurality of media inputs;
   encoding the plurality of media inputs into a plurality of digital signals;
   inserting, by the plurality of encoders, a first message into at least one of the plurality of digital signals indicating a media signal splice-in point and a media signal splice-out point; and
   allocating a single fixed bitrate to each of the digital signals having a first message according to media signal encoding, the single fixed bitrate being allocated to the digital signal between the media signal splice-in point and the media signal splice-out point indicated by the first message thereby facilitating insertion of a video signal without requiring compression of the inserted signal.

10. The method of claim 9 wherein the media signal is encoded at a constant bitrate.

11. The method of claim 10 further comprising:
    receiving a pre-defined bitrate for a media signal.

12. The method of claim 11 wherein the allocated bitrate is a pre-defined bitrate, irrespective of coding complexity of a program in which the media signal is inserted.

13. The method of claim 9 wherein the media signal is encoded at a variable bitrate.

14. The method of claim 13 wherein the allocated bitrate is a maximum of the variable bitrate, irrespective of coding complexity of a program in which the media signal is inserted.

15. The method of claim 9 further comprising:
sending, by the plurality of encoders, a second message to a rate controller indicating the media signal splice-in point and the media signal splice-out point for each digital signal; and
synchronizing, by the rate controller, the plurality of encoders to a common time base, aligning the media signal splice-in points and the media signal splice-out points of the digital signals having a second message.

16. The method of claim 9 wherein the media input is selected from the group consisting of:
a video input; and
an audio input.

17. The method of claim 9 wherein the media signal is selected from the group consisting of:
an advertisement;
a movie;
a song;
a video program; and
audio clip.

18. A system for bit allocation for media signal insertion comprising:
a plurality of encoders, wherein the encoders are configured to insert a first message indicating a media signal splice-in point and a media signal splice-out point of a media signal into a digital signal and further configured to transmit a second message indicating the media signal splice-in point and the media signal splice-out point to a rate controller;
a rate controller, coupled to the encoders and receiving feedback from the encoders, the rate controller being configured to synchronize the plurality of encoders to a common time base based on the feedback received from the encoders, thereby aligning the media signal splice-in points and the media signal splice-out points of the digital signals, the rate controller being further configured to allocate a fixed bitrate to each of the digital signals having media signal splice-in and splice-out points, the fixed bitrate being allocated to the digital signals between the media signal splice-in points and the media signal splice-out points thereby facilitating insertion of a standard advertisement without requiring transcoding or compression of the advertisement.

19. The system of claim 18 wherein the media signal is encoded at a constant bitrate.

20. The system of claim 19 further comprising:
receiving a pre-defined bitrate for a media signal.

21. The system of claim 20 wherein the allocated bitrate is a pre-defined bitrate, irrespective of coding complexity of a program in which the media signal is inserted.

22. The system of claim 18 wherein the media signal is encoded at a variable bitrate.

23. The system of claim 22 wherein the allocated bitrate is a maximum of the variable bitrate, irrespective of coding complexity of a program in which the media signal is inserted.

24. The method of claim 18 wherein the media input is selected from the group consisting of:
a video input; and
an audio input.

25. The system of claim 18 wherein the media signal is selected from the group consisting of:
an advertisement;
a movie;
a song;
a video program; and
audio clip.

26. A system for bit allocation for media signal insertion comprising:
a plurality of encoders, wherein the encoders are configured to insert a first message indicating a media signal splice-in point and a media signal splice-out point of a media signal into a digital signal;
a multiplexer, coupled to the encoders, configured to allocate a fixed bitrate to each of the digital signals having media signal splice-in and splice-out points, the fixed bitrate being allocated to the digital signals between the media signal splice-in points and the media signal splice-out points thereby facilitating insertion of a standard advertisement without requiring transcoding or compression of the advertisement.

27. The system of claim 26 wherein the media signal is encoded at a constant bitrate.

28. The system of claim 27 further comprising:
receiving a pre-defined bitrate for a media signal.

29. The system of claim 28 wherein the allocated bitrate is a pre-defined bitrate, irrespective of coding complexity of a program in which the media signal is inserted.

30. The system of claim 26 wherein the media signal is encoded at a variable bitrate.

31. The system of claim 30 wherein the allocated bitrate is a maximum of the variable bitrate, irrespective of coding complexity of a program in which the media signal is inserted.

32. The system of claim 26 wherein the media input is selected from the group consisting of:
a video input; and
an audio input.

33. The system of claim 26 wherein the media signal is selected from the group consisting of:
an advertisement;
a movie;
a song;
a video program; and
audio clip.

* * * * *